(12) United States Patent
Dong et al.

(10) Patent No.: US 11,594,788 B2
(45) Date of Patent: Feb. 28, 2023

(54) ELECTRIC CONNECTION ASSEMBLY

(71) Applicants: Tyco Electronics (Shanghai) Co. Ltd., Shanghai (CN); Tyco Electronics Japan G.K., Kawaski (JP)

(72) Inventors: Litao Dong, Shanghai (CN); Ziwei Li, Shanghai (CN); Haifeng Liu, Kanagawa (JP)

(73) Assignees: TYCO ELECTRONICS (SHANGHAI) CO. LTD., Shanghai (CN); TYCO ELECTRONICS JAPAN G.K., Kanagawa (JP)

( * ) Notice: Subject to any disclaimer, the term of this patent is extended or adjusted under 35 U.S.C. 154(b) by 340 days.

(21) Appl. No.: 16/549,340

(22) Filed: Aug. 23, 2019

(65) Prior Publication Data

US 2020/0067057 A1 Feb. 27, 2020

(51) Int. Cl.
*H01R 13/02* (2006.01)
*H01R 11/11* (2006.01)
*H01R 13/518* (2006.01)
*H01R 25/16* (2006.01)
*H01M 50/502* (2021.01)
*H01M 50/20* (2021.01)

(52) U.S. Cl.
CPC ......... *H01M 50/502* (2021.01); *H01M 50/20* (2021.01); *H01R 11/11* (2013.01); *H01R 13/02* (2013.01); *H01R 13/518* (2013.01); *H01R 25/16* (2013.01)

(58) Field of Classification Search
CPC ........ H01R 13/40; H01R 13/405; H01R 9/16; H01R 9/22; H01R 9/223; H01R 9/24; H01R 13/4223; H01M 50/20; H01M 50/502
See application file for complete search history.

(56) References Cited

U.S. PATENT DOCUMENTS

| | | | | |
|---|---|---|---|---|
| 3,238,287 | A | * | 3/1966 | Chapman .......... B29C 45/14426 264/276 |
| 4,604,259 | A | * | 8/1986 | Whitman .............. C22C 1/0425 419/2 |
| 8,916,287 | B2 | * | 12/2014 | Kim .................... H01M 50/172 429/178 |

* cited by examiner

*Primary Examiner* — Oscar C Jimenez
*Assistant Examiner* — Paul D Baillargeon
(74) *Attorney, Agent, or Firm* — Potomac Law Group, PLLC; Bruce J. Wolstoncroft

(57) ABSTRACT

The present disclosure discloses an electric connection assembly having a support and a connector; the support comprises a support body; the support body is provided with a mounting groove and a limiting protrusion; at least part of the connector is arranged within the mounting groove; and the limiting protrusion can cooperate with the connector so as to prevent the connector from withdrawing from the mounting groove. Compared with the prior art, the electric connection assembly is simple in overall structure and convenient to assemble. In the electric connection assembly, the stability of the integral assembly of the connector and the support can be enhanced by arranging the corresponding limiting protrusions on the support. Particularly, compared with the support and the connector which are integrally formed by embedded injection molding, the electric connection assembly can avoid the problems of fixed mounting position, inflexibility and the like of the connector due to reasons such as tolerance and the like.

15 Claims, 7 Drawing Sheets

ELECTRIC CONNECTION ASSEMBLY

TECHNICAL FIELD

The present disclosure relates to an electric connection structure, in particular to an electric connection assembly which may be used for connecting a lithium battery.

BACKGROUND

Existing electronic components, such as lithium batteries, often require corresponding electric connection through corresponding electric connection assembly. It is necessary to consider how to achieve the structural simplicity and the convenience of assembling for the electric connection assembly.

SUMMARY OF INVENTION

One purpose of the present disclosure is directed to overcome the defects in the prior art and provide an electric connection assembly which is simple in structure and convenient to assemble.

An electric connection assembly comprises:

a support comprising a support body; the support body is provided with a mounting groove and a limiting protrusion; and a connector, wherein at least part of the connector is arranged in the mounting groove;

the limiting protrusion can cooperate with the connector so as to prevent the connector from withdrawing from the mounting groove.

According to one embodiment of the present disclosure, the support body is provided with a mounting inlet at one end of the mounting groove; and the connector may be mounted to the mounting groove from the mounting inlet.

According to one embodiment of the present disclosure, the limiting protrusion protrudes from the support body; and at least part of the limiting protrusion extends into the mounting inlet, or the limiting protrusion is arranged in the mounting groove and is positioned at the mounting inlet.

According to one embodiment of the present disclosure, the bottom wall of the connector is provided with a guide groove having a head end (or starting end) and a tail end;

when the connector is mounted to the support, the limiting protrusion partially or entirely extends into the guide groove;

the connector can move along the mounting direction to pass over the limiting protrusion, and is arranged in the mounting groove; and the limiting protrusion cooperates with the connector to keep the connector on the support.

According to one embodiment of the present disclosure, the depth of the guide groove is gradually reduced from the head end (or starting end) to the tail end.

According to one embodiment of the present disclosure, the guide groove configures to extend through a side wall of the connector, and form a guide notch in the side wall.

According to one embodiment of the present disclosure, the connector has a second side wall; and the second side wall may be arranged to cooperate with the limiting protrusion along a radial direction of the connector.

According to one embodiment of the present disclosure, the support body is provided with a blocking wall at the other end of the mounting groove; and the blocking wall is arranged to cooperate with the connector in the mounting direction of the connector.

According to one embodiment of the present disclosure, the connector comprises a mounting portion; part or entire of the mounting portion is arranged within the mounting groove;

the support further comprises a blocking arm; and the blocking arm is arranged on the support body and extends to cooperate with the mounting portion along an axial direction of the mounting portion.

According to one embodiment of the present disclosure, the mounting portion is provided with a stop step; and the stop step can be provided in to cooperate with the blocking arm along an axial direction of the mounting portion.

According to one embodiment of the present disclosure, the mounting portion and the blocking arm are spaced apart along an axial direction of the mounting portion.

According to one embodiment of the present disclosure, the mounting portion is arranged in the mounting groove in a clearance fit mode.

According to one embodiment of the present disclosure, the connector comprises a metal bolt.

According to one embodiment of the present disclosure, the support is an injection molding piece.

According to one embodiment of the present disclosure, the support is a battery module cover plate.

According to one embodiment of the present disclosure, the electric connection assembly further comprises:

a plurality of bus-bars secured to the support body for electrically connecting a plurality of cells;

one of the plurality of bus-bars is electrically connected with the connector.

According to one embodiment of the present disclosure, the electric connection assembly further comprises:

an output connector in contact and electric connection with the bus-bar; and a fastener which can be fixedly arranged on the connector and cause the bus-bar and the output connector to be in abutting connection with each other.

According to one embodiment of the present disclosure, the support and the connector are respectively formed and arranged in a mounting and connecting manner.

According to one embodiment of the present disclosure, the connector is an integral piece.

According to one embodiment of the present disclosure, the connector is an embedded injection molding piece.

Compared with the prior art, the electric connection assembly is simple in overall structure and convenient to assemble. In the electric connection assembly, the stability of the integral assembly of the connector and the support can be enhanced by arranging the corresponding limiting protrusions on the support. Particularly, compared with the support and the connector which are integrally formed by embedded injection molding, the electric connection assembly can avoid the problems of fixed mounting position, inflexibility and the like of the connector due to reasons such as tolerance and the like. Correspondingly, the electric connection assembly can be conveniently, safely and stably assembled and matched with components such as a cell, thereby having strong universal performance.

According to one embodiment of the present disclosure, the connector is firmly mounted to the mounting groove of the support by the mounting portion. The connector can cooperate with a bus-bar serving as a matched connector to limit the position of the bus-bar by the protruding part, so that the stability of the electric connection is improved.

According to one embodiment of the present disclosure, the support assembled and mated with the connector can be further conveniently assembled by providing a notch communicating with the mounting groove.

DETAILED DESCRIPTION OF EMBODIMENTS

Hereinafter, the present disclosure will be described in detail with reference to the accompanying drawings.

Embodiment 1

Figure 1:
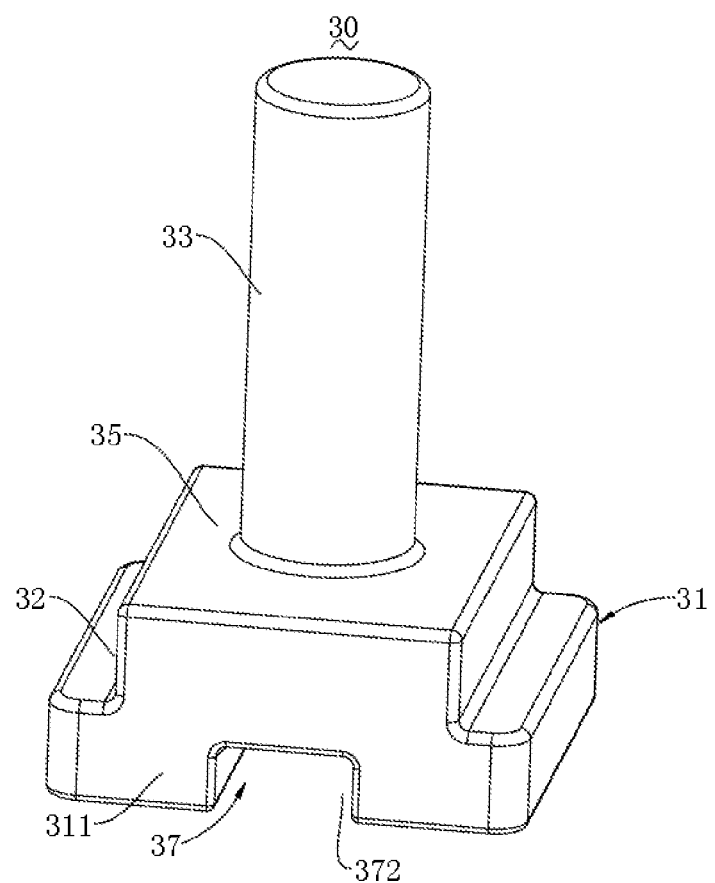
FIG. 1 is a perspective schematic structural diagram of a connector provided by the present disclosure.
Figure 2:
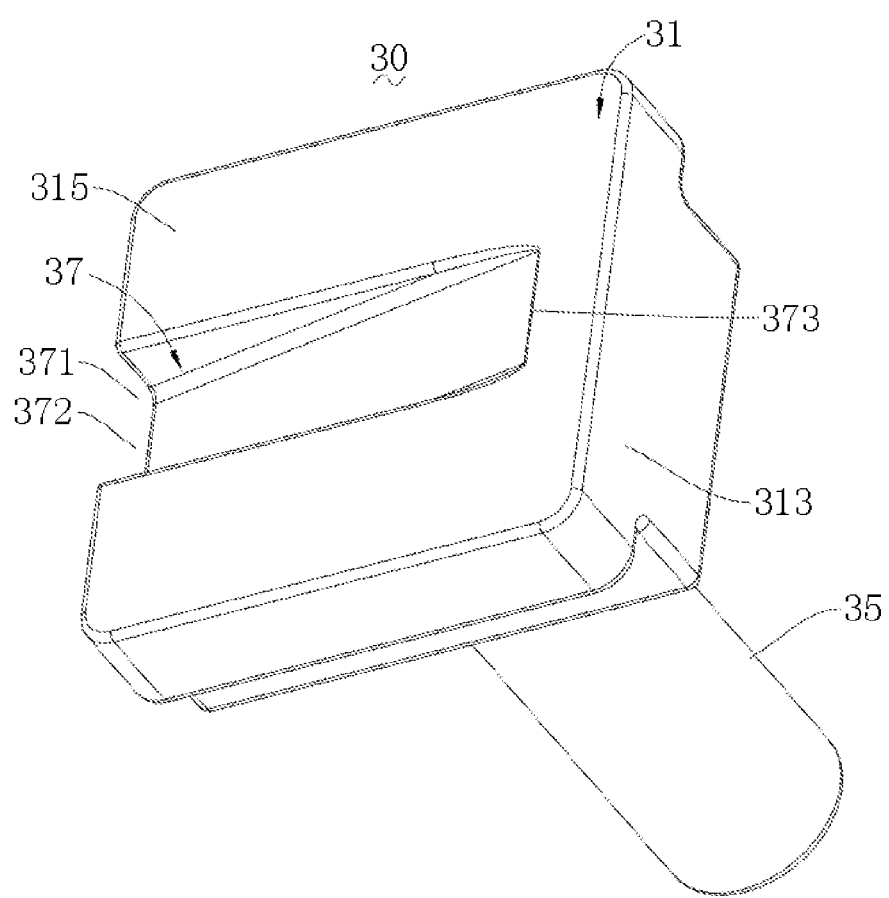
FIG. 2 is a perspective schematic structural diagram of the connector of FIG. 1 showing a bottom wall of a mounting portion.

Referring to FIGS. 1 and 2, the present disclosure provides a connector 30. The connector 30 is disposed on the support 10 described below, and may be connected to a corresponding matched connector 70. The connector 30 may be integrally assembled with the support 10 by being mounted to the mounting groove 14 of the support 10. The connector 30 includes a mounting portion 31 and a projection 33. The mounting portion 31 has a radial direction and an axial direction. The projection 33 protrudes axially from the mounting portion 31.

The mounting portion 31 is arranged in the mounting groove 14 described below. The mounting portion 31 is specifically shaped and configured such that it can be arranged in the mounting groove 14 described below. In the present embodiment, the mounting portion 31 is substantially block-shaped. More specifically, the mounting portion 31 is a cuboid block. The mounting portion 31 has a side wall 311. The mounting portion 31 further has a second side wall 313 disposed opposite to the side wall 311. Accordingly, in the present embodiment, the mounting portion 31 has four side walls connected end to end with each other.

In order to facilitate the engagement of the mounting portion 31 with the limiting protrusion 19 on the support 10, the bottom wall 315 of the mounting portion 31 is provided with a guide groove 37. The guide groove 37 is surrounded by a guide groove wall. The guide groove 37 extends from the mounting direction in which the connector 30 is mounted to the mounting groove 14 of the support 10, and has a head end (or starting end) 371 and a tail end 373. In order to save effort and stably assemble into a whole, the depth of the guide groove 37 is gradually reduced in the mounting direction in which the connector 30 is mounted to the mounting groove 14 of the support 10. That is, the depth of the guide groove 37 is gradually reduced from the head end (or starting end) 371 to the tail end 373 in a direction rearward of the front end of the connector 30. The rearward direction of the front end of the connector 30 is the reverse direction in which the connector 30 is mounted to the guide groove 37, and also it is the direction from a side wall 311 to the second side wall 313 of the mounting portion 31. To facilitate the assembly, one end of the guide groove 37 extends through a side wall 311 of the mounting portion 31, and a guide notch 372 is formed in the side wall 311. The guide notch 372 is located at the head end (or starting end) 371. The guide groove 37 is spaced apart from the second side wall 313 of the mounting portion 31. Accordingly, when the connector 30 is mounted to the mounting groove 14 of the support 10 described below, and the guide groove 37 and the limiting protrusion 19 of the support 10 are moved with respect to each other, the limiting protrusion 19 enters the guide groove 37 from the guide notch 372 on the side wall 311, and then continues to move to extend beyond the guide groove 37 described below until aligned with the second side wall 313 of the mounting portion 31. The mounting portion 31 is spaced apart from the blocking arm 18 of the support 10 described below in the axial direction of the mounting portion 31. That is, the mounting portion 31 is in clearance fit with the mounting groove 14 of the support 10 described below, so that a corresponding degree of movement can be achieved in order to facilitate the movement of the connector 30 to a position in which the matched connector 70 is fitted.

The mounting portion 31 is provided with a stop step 32 to cooperate with the blocking arm 18 of the support 10. The stop step 32 may be cooperated with the blocking arm 18 in the radial direction of the connector 30, thereby preventing the connector 30 from axially disengaging from the mounting groove 14 described below. The stop step 32 extends a full circle in the circumferential direction of the connector 30. In the present embodiment, the stop steps 32 are provided at both sides of the mounting portion 31, respectively, in order to facilitate manufacturing and assembly.

The projection 33 extends from the mounting portion 31 in the radial direction of the connector 30. That is, the projection 33 is provided on the mounting portion 31 and protrudes therefrom. The projection 33 serves to limit and keep the position of the matched connector 70. The projection 33 may be of any shape and configuration. In the present embodiment, the projection 33 is substantially cylindrical.

The projection 33 has a smaller radial dimension than that of the mounting portion 31 in order to improve the supporting and contacting performance of the matched connector 70. Accordingly, the mounting portion 31 radially protrudes with respect to the projection 33, and forms a support step 35 for supporting the matched connector 70. In the present embodiment, the support step 35 is provided as an annular step. The support step 35 protrudes from the support body 10. The support step 35 protrudes outwards from the mounting groove 14 described below. More specifically, the support step 35 radially protrudes with respect to the top surface of the blocking arm 18.

The connector 30 is an integral piece to facilitate the manufacture. Specifically, the connector 30 comprises a metal piece. In the present embodiment, the connector 30 comprises a bolt.

Embodiment 2

Figure 3:
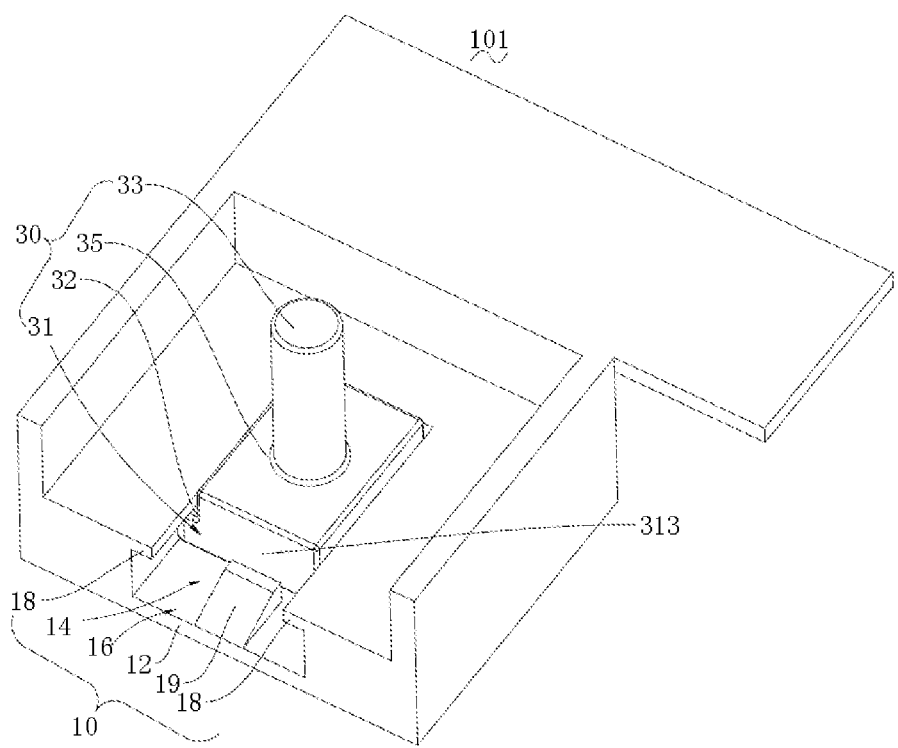
FIG. 3 is a perspective schematic structural diagram of an electric connection assembly provided by the present disclosure.

Referring to FIG. 3, the present disclosure further provides an electric connection assembly 101. The electric connection assembly 101 comprises a support 10 and a connector 30 as described in Embodiment 1.

Figure 4:
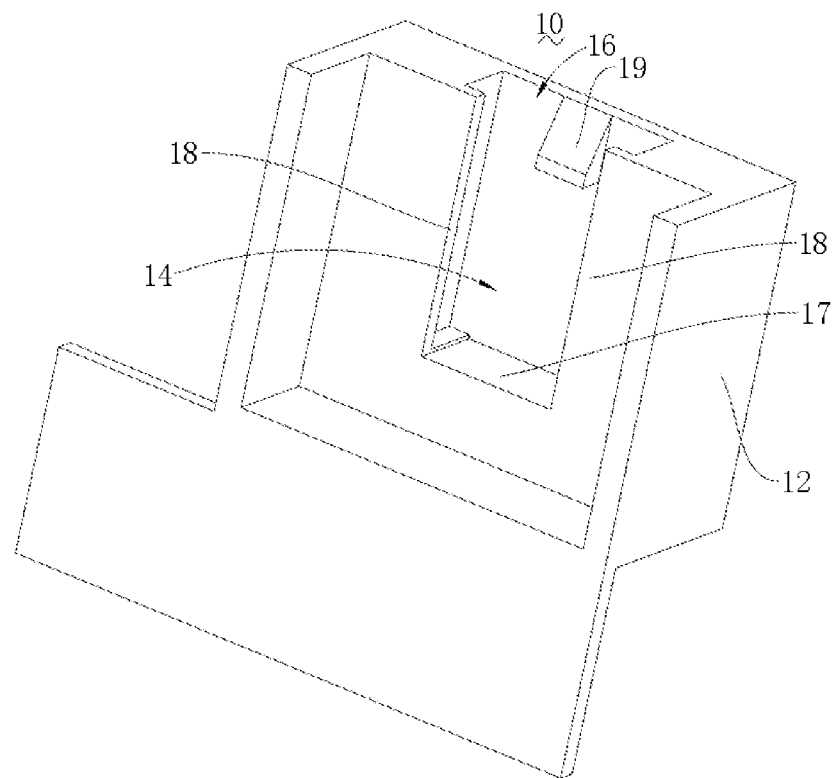
FIG. 4 is a perspective schematic structural diagram of a support of FIG. 3.
Figure 5:
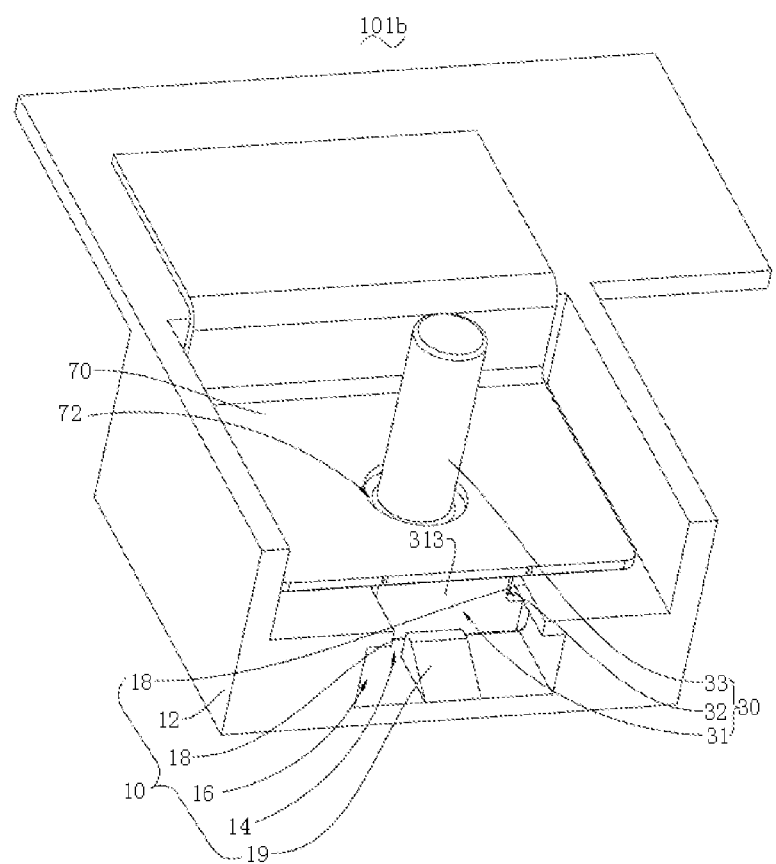
FIG. 5 is an enlarged perspective schematic structural diagram of another implementation of the electric connection assembly of FIG. 3.
Figure 6:
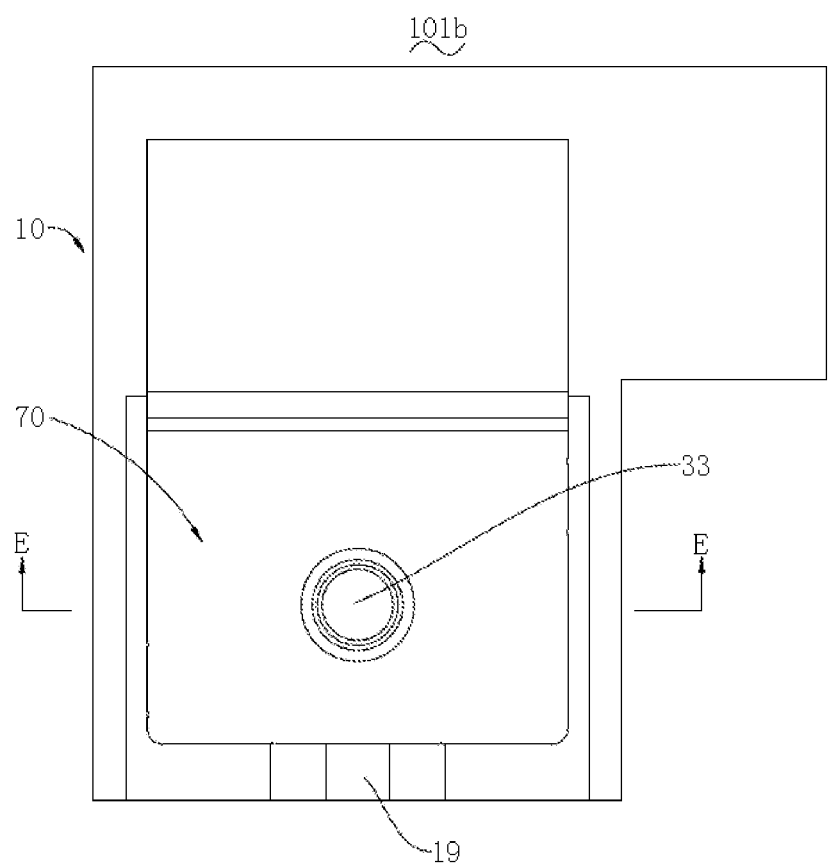
FIG. 6 is an axial projection view of the electric connection assembly of FIG. 5.
Figure 7:
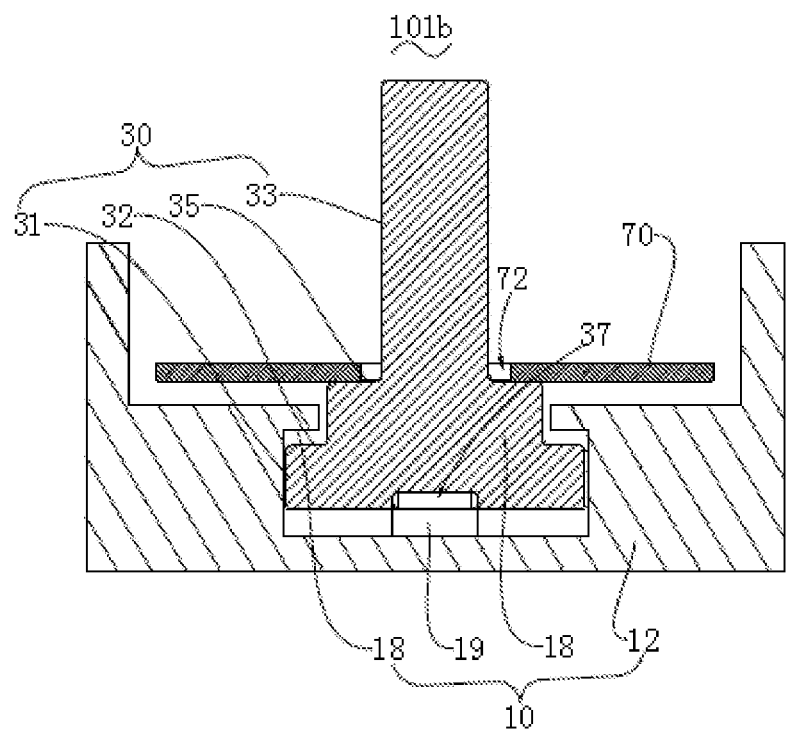
FIG. 7 is a cross-sectional view of the electric connection assembly of FIG. 6 taken along a line E-E.
Figure 8:
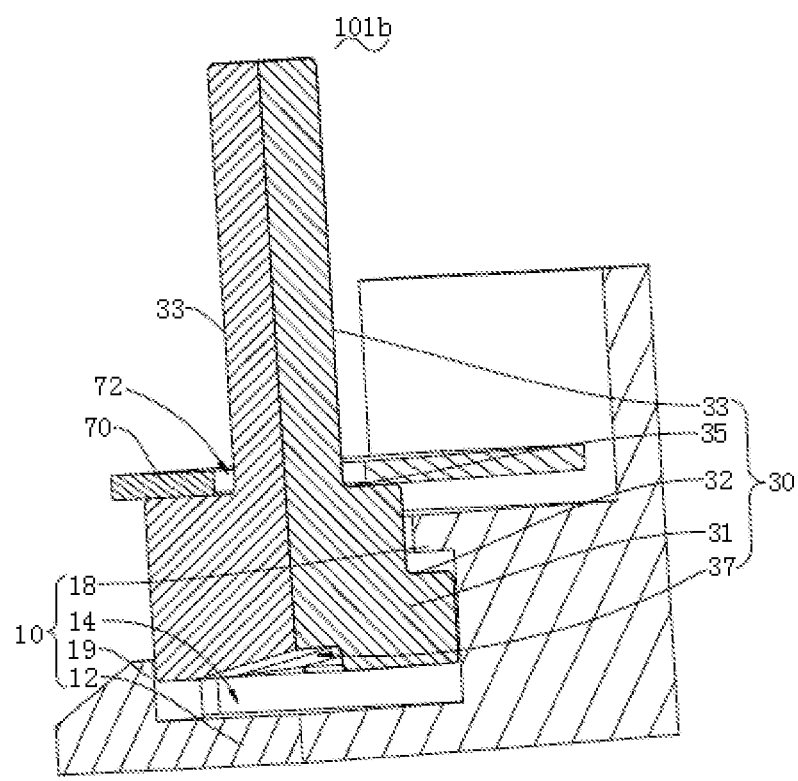
FIG. 8 is a partial perspective cross-sectional view of the electric connection assembly of FIG. 5.

Referring to FIG. 4 together, the support 10 is used to support and mount the connector 30. The support 10 comprises a support body 12. The support body 12 may be used to support external electronic elements. The particular shape and configuration of the support body 12 is selected as desired. In the present embodiment, the support 10 is a battery module cover plate. Accordingly, the support body 12 is substantially plate-shaped. The support body 12 is provided with a mounting groove 14. The mounting groove 14 is specifically shaped and configured to receive and keep the connector 30. In the present embodiment, the mounting groove 14 has a substantially cuboid space.

The support body 12 is provided with a mounting inlet 16 to further facilitate the installation and disassembly. The mounting inlet 16 is provided in communication with the mounting groove 14. The mounting inlet 16 allows the connector 30 to be mounted into the mounting groove 14. More specifically, the mounting inlet 16 allows the connector 30 to be mounted into the mounting groove 14 in the radially direction of the connector 30.

The support 10 further comprises a blocking wall 17. The blocking wall 17 is provided at the other end of the mounting groove 14 and opposite to the mounting inlet 16. The blocking wall 17 is provided for cooperating with the mounting portion 31 of the connector 30. Specifically, the blocking wall 17 may prevent the mounting portion 31 from further moving in the mounting direction of the mounting portion 31 so as to keep the mounting portion 31 in the mounting groove 14 when the connector 30 is mounted within the mounting groove 14. It will be understood that the direction from one end to the other of the mounting grooves 14 is same as the mounting direction of the connector 30.

The support 10 also includes a blocking arm 18 to further conveniently enhance the stably-maintained integration of the connector 30 by the support 10. The blocking arm 18 is disposed on the support body 12 and protrudes into the mounting groove 14. The blocking arm 18 may cooperate with the connector 30 in axial direction of the connector 30 to prevent the connector 30 from escaping from the mounting groove 14. The specific extension and projection length of the blocking arm 18 is configured such that radial blocking to the connector 30 can be achieved. In the present embodiment, the blocking arm 18 is disposed along an extended path of the groove wall of the entire mounting groove 14.

To further enhance the stably-maintained integration of the connector 30 by the support 10, the support body 12 is provided with a limiting protrusion 19. The limiting protrusion 19 protrudes from the support body 12. The limiting protrusions 19 are arranged in the mounting grooves 14 at the mounting inlets 16. That is, the limiting protrusion 19 is provided so as to prevent the connector 30 from withdrawing from the mounting groove 14 through the mounting inlet 16. Specifically, the limiting protrusion 19 may cooperate with the second side wall 313 of the mounting portion 31. The specific shape and configuration of the limiting protrusion 19 is configured such as to be capable of cooperating with the guide groove 37 of the connector 30 and cooperating with the connector 30. In the present embodiment, the limiting protrusion 19 has a guide inclined surface 192 in order to facilitate an effort-saving sliding between the limiting protrusion 19 and the guide groove 37 and mounting the connector 30 into the mounting groove 14 protrusion. The inclined height of the guide inclined surface 192 is gradually increased in the assembling direction of the connector 30. The limiting protrusion 19 also has a blocking surface 194. The blocking surface 194 may be provided to cooperate with the second sidewall 313 of the mounting portion 31. The blocking surface 194 is vertically extended to enhance blocking performance. That is, the blocking surface 194 axially extends along the mounting portion 31. The limiting protrusion 19 may be provided on the support body 12 in any manner. In the present embodiment, the limiting protrusion 19 is constructed as an integral piece with the support body 12.

The support 10 is an injection molding piece in order to facilitate manufacturing and provide better electrical insulation properties. The support 10 is an integral piece. That is, the support 10 is integrally formed by injection molding. Accordingly, the connector 30 and the support 10 are separately formed and separated from each other, and are mounted and connected together.

Embodiment 3

Referring to FIGS. 5 to 8, the present disclosure further provides an electric connection assembly 101b. The electric connection assembly 101b includes a matched connector 70 and the electric connection assembly 101 described above.

The matched connector 70 is electrically connected to the connector 30. The specific specifications, types and structures of the matched connector 70 are selected as required so long as corresponding electric connections are possible. In the present embodiment, the matched connector 70 is used to electrically connect a battery cell (not shown). The matched connector 70 may be electrically connected to the connector 30 in any manner. In the present embodiment, the matched connector 70 has a mounting through hole 72 in order to enhance the stability of the electric connection of the matched connector 70 with the connector 30. The mounting through hole 72 is provided through in the radial direction of the connector 30. The matched connector 70 is mounted to the projection 33 of the connector 30 through the mounting through hole 72. That is, the matched connector 70 is sleeved on the projection 33. That is, the projection 33 extends through the mounting through hole 72. In the present embodiment, the matched connector 70 is a bus-bar in order to enhance current transmission performance. More specifically, the matched connector 70 may be a copper-aluminum bimetal structure to enhance corrosion resistance.

Embodiment 4

Figure 9:
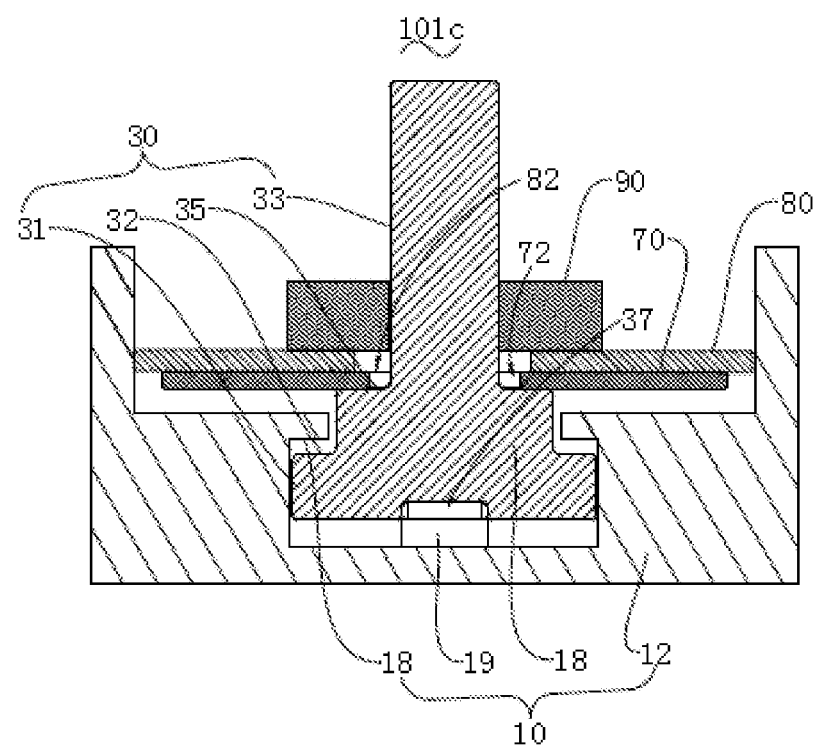
FIG. 9 is a cross-sectional view of another embodiment of the electric connection assembly of FIG. 3.

Referring to FIG. 9, the present disclosure further provides an electric connection assembly 101c. Unlike the aforementioned electric connection assembly 101b, the electric connection assembly 101c further includes an output connector 80 in order to facilitate output of corresponding electrical energy and/or signals. The output connector 80 is electrically connected to the matched connector 70.

The output connector 80 may be electrically connected to the matched connector 70 via the connector 30 indirectly. In the present embodiment, the output connector 80 is in direct contact and electric connection with the matched connector 70. The specific type and shape of the output connector 80 is configured such that corresponding electric connections are possible. The output connector 80 has a limiting through hole 82 in order to enhance stable electric connection performance of the output connector 80 with the matched connector 70,. The output connector 70 is sleeved on the projection 33 of the connector 30 through the limiting through hole 82. That is, the projection of the connector 30 extends through the limiting through hole 82 of the output connector 80.

The output connector 80 may be electrically connected to a Cell Supervision Circuit (CSC), a Cell Management Unit (CMU) or a Battery Management System (BMS) to transmit corresponding electrical signals and/or currents.

To further enhance the stable electric connection of the output connector 80 to the matched connector 70, the electric connection assembly 101b further includes a fastener 90. The fasteners 90 is provided on the projection 33 of the connector 30. The fastener 90 abuts on the output connector 80 and is configured such that the output connector 80 abuts on the matched connector 70. In the present embodiment, the fastener is a nut for ease of assembly. Correspondingly, the connector 30 comprises a bolt. The fastener 90 is threadedly fastened with the projection 33 of the connector 30 into a whole. In a preferred embodiment, the connector 30 is an embedded injection molding piece in which the projection 33 is an embedded piece. The projection 33 may be a metal bolt, such as a standard bolt piece.

Embodiment 5

The present disclosure also provides a battery module (not shown). The battery module includes a cell and an electric connection assembly 101 (or 101b or 101c) described above. The cell is a single cell of a lithium battery. The number of the cells is selected as required. Generally, each of the battery modules includes a plurality of cells. If desired, the battery module includes a corresponding housing for supporting the cell. The matched connector 70 is provided in electric connection with the cell.

It should be noted that "upper and lower", "left and right", and "front and rear" and the like in the present disclosure are relative orientation concepts and are used only in conjunction with the drawings as examples to understand the relative orientation of the various components. Here, the "axial direction of the mounting portion 31" is the upward and downward directions in FIGS. 7 and 9. Accordingly, the "radial direction of the mounting portion 31" is a direction perpendicular to the axial direction. In addition, "top and bottom" are upward and downward directions in FIGS. 7 and 9.

The above are merely preferred embodiments of the present disclosure and are not intended to limit the scope of the present disclosure, and any amendments, equivalents or improvements within the spirit of the present disclosure are intended to be included within the scope of the claims of the present disclosure.

What is claimed is:

1. An electric connection assembly, comprising:
    a support comprising a support body provided with a mounting groove, a blocking arm and a limiting protrusion; and
    a connector, at least part of which is arranged within the mounting groove, the connector has a first side wall, a second side wall and a mounting portion, the mounting portion having a bottom wall having a guide groove, the guide groove has a head end and a tail end, the guide groove extending through the second side wall of the connector toward the first side wall, a guide notch extending through the second side wall at the head end of the guide groove, a depth of the guide groove is gradually reduced from the head end to the tail end;
    wherein the limiting protrusion is configured to cooperate with the first side wall of the connector along a radial direction of the connector so as to prevent the connector from withdrawing from the mounting groove; and
    wherein the blocking arm is configured to cooperate with the mounting portion along an axial direction of the mounting portion.

2. The electric connection assembly of claim 1, wherein:
    the support body is provided with a mounting inlet at one end of the mounting groove;
    the connector may be mounted to the mounting groove via the mounting inlet.

3. The electric connection assembly of claim 2, wherein:
    the limiting protrusion protrudes from the support body; and
    at least part of the limiting protrusion extends into the mounting inlet, or the limiting protrusion is arranged within the mounting groove and positioned at the mounting inlet.

4. The electric connection assembly of claim 2, wherein:
    the limiting protrusion partially or entirely extends into the guide groove when the connector is mounted to the support;
    the connector may move along the mounting direction to pass over the limiting protrusion and is arranged within the mounting groove; and
    the limiting protrusion cooperates with the connector to keep the connector on the support.

5. The electric connection assembly of claim 1, wherein part or entire of the mounting portion is arranged within the mounting groove.

6. The electric connection assembly of claim 5, wherein:
    the mounting portion is provided with a stop step;
    the stop step can be provided to cooperate with the blocking arm along an axial direction of the mounting portion.

7. The electric connection assembly of claim 5, wherein the mounting portion and the blocking arm are spaced apart in the axial direction of the mounting portion.

8. The electric connection assembly of claim 5, wherein the mounting portion is arranged in the mounting groove in a clearance fit mode.

9. The electric connection assembly of claim 1, wherein the connector comprises a metal bolt.

10. The electric connection assembly of claim 1, wherein the support is an injection molding piece.

11. The electric connection assembly of claim 1, wherein the support is a battery module cover plate.

12. The electric connection assembly of claim 1, further comprising a plurality of bus bars secured to the support body for electrically connecting a plurality of cells;
    wherein one of the plurality of bus-bars is electrically connected to the connector.

13. The electric connection assembly of claim 12, further comprising:
    an output connector in contact and electric connection with the bus-bar; and
    a fastener which can be fixedly arranged on the connector and make the bus-bar and the output connector to abut against each other.

14. The electric connection assembly of claim 1, wherein the support and the connector are respectively formed and arranged in a mounting and connecting manner.

15. The electric connection assembly of claim 1, wherein the connector is an integral piece.

* * * * *

UNITED STATES PATENT AND TRADEMARK OFFICE
CERTIFICATE OF CORRECTION

| | |
|---|---|
| PATENT NO. | : 11,594,788 B2 |
| APPLICATION NO. | : 16/549340 |
| DATED | : February 28, 2023 |
| INVENTOR(S) | : Litao Dong, Ziwei Vivi Li and Haifeng Liu |

It is certified that error appears in the above-identified patent and that said Letters Patent is hereby corrected as shown below:

On the Title Page

Please correct to include the priority data as follows:
CN201821368499.1 - August 23, 2018

Signed and Sealed this
Fourth Day of April, 2023

Katherine Kelly Vidal
*Director of the United States Patent and Trademark Office*